Feb. 27, 1940.   W. C. CRIMMINS   2,191,932
BICYCLE LAMP STRUCTURE
Filed Sept. 24, 1938
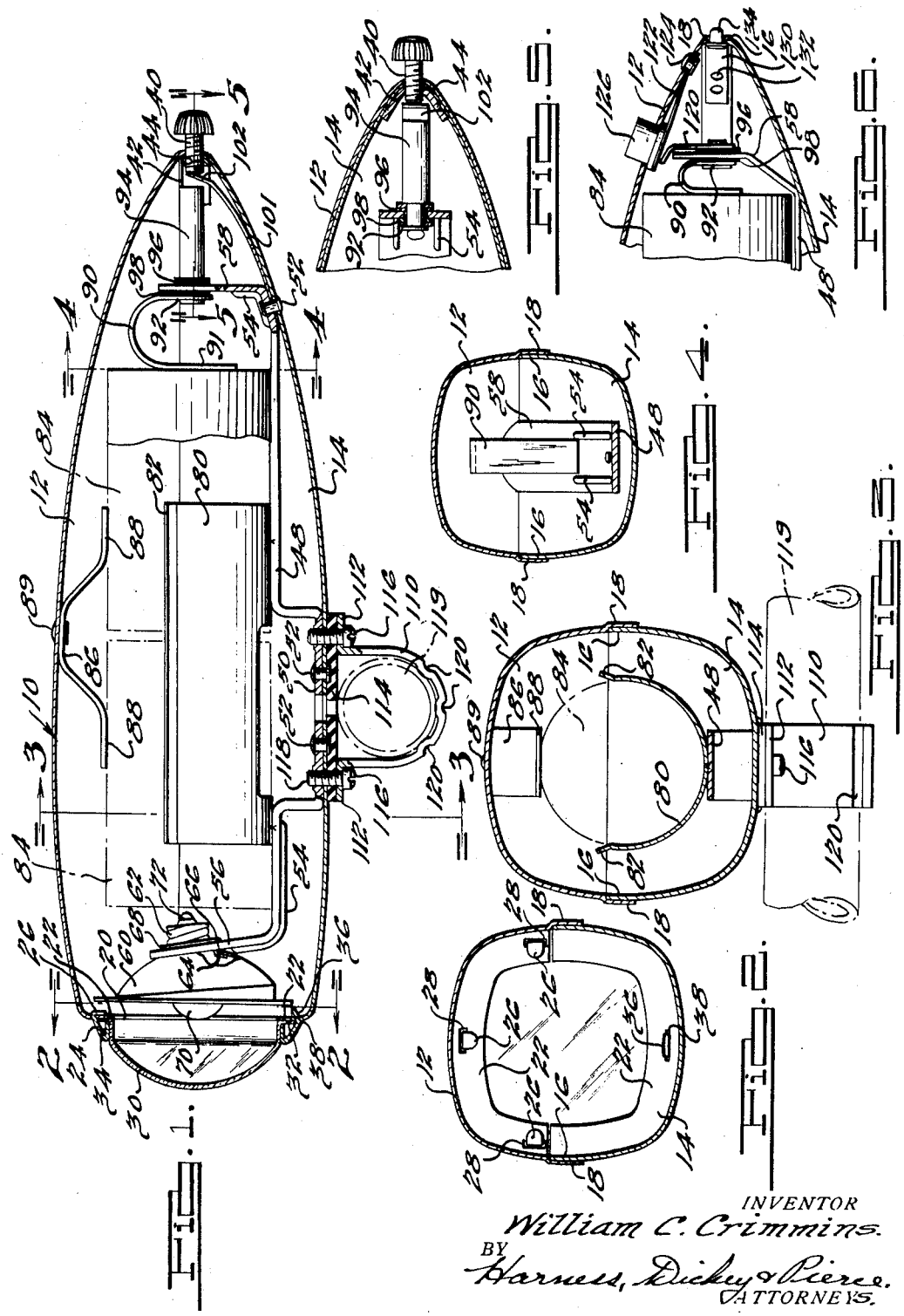
INVENTOR
William C. Crimmins.
BY Harness, Dickey & Pierce
ATTORNEYS.

Patented Feb. 27, 1940

2,191,932

UNITED STATES PATENT OFFICE 2,191,932

BICYCLE LAMP STRUCTURE

William C. Crimmins, Marion, Ind., assignor to Delta Electric Company, Marion, Ind., a corporation of Indiana Application September 24, 1938, Serial No. 231,468

3 Claims. (Cl. 240—7.55)

This invention relates in general to a light and/or horn structure for mounting upon a bicycle.

One of the primary objects of the invention is to provide a structure of the type mentioned in which the number of parts is reduced to a minimum, thereby effecting considerable economy in the manufacture of the structure.

Another object of the invention is to provide an improved and simplified bicycle lamp structure including an improved and simplified switch mechanism.

Another object of the invention is to provide an improved and simplified structure for mounting a light and/or horn casing on a bicycle.

Another object of the invention is to provide a unitary mounting bracket which serves to mount dry cells, a switch mechanism, and a light or horn mechanism as a unit so that such means and mechanism may be assembled as a unit.

Another object of the invention is to provide an improved switch mechanism in which one of the switch elements also serves as a removable assembly member, thereby simplifying the structure and effecting considerable economy.

Other objects of the invention will become apparent from the following specification, the drawing relating thereto, and from the claims hereinafter set forth.

In the drawing, in which like numerals are used to designate like parts in the several views throughout:

Figure 1 is a longitudinal cross-sectional view, with parts in elevation, of a lamp structure embodying features of the present invention;

Fig. 2 is a cross-sectional view taken substantially along the line 2—2 of Fig. 1;

Fig. 3 is a cross-sectional view taken substantially along the line 3—3 of Fig. 1;

Fig. 4 is a cross-sectional view taken substantially along the line 4—4 of Fig. 1;

Fig. 5 is a cross-sectional view taken substantially along the line 5—5 of Fig. 1; and Fig. 6 is a fragmentary vertical cross-sectional view of the rear end of the casing illustrated in Fig. 1 having a modified form of switch mechanism associated therewith which is particularly adapted for use with a horn structure.

Referring to the drawing, a casing is generally indicated at 10 which is divided longitudinally into separable upper and lower sections 12 and 14, respectively. The upper and lower sections are preferably formed of a sheet metal stamping and the lower section 14 terminates in an upwardly directed flange 16 which is telescopically received within a downwardly directed flange 18 formed on the upper section 12. The two casing sections are preferably formed so as to taper toward the rear end thereof and to provide a forwardly facing opening 20 when the two sections are assembled. The forwardly facing opening 20 is defined by complementary inwardly directed flanges 22 formed on the upper and lower sections 12 and 14.

A retainer ring 24 having a shape complementary to that of the opening 20, but being slightly larger than the opening 20, is mounted to the upper section 12 by means of tabs 26 which are adapted to extend through openings 28 in the upper flange 22. A lens 30 of non-shatterable transparent material is mounted within the retainer ring 24 and has outwardly flanged edges 32. The outwardly flanged edges 32 in the upper half of the lens 30 are received between the inner edge of a reversely bent portion 34 of the ring 24, so that the flanges 32 are held against the upper flange 22. The retainer ring 24 with the lens 30 may be fixed to the upper section by inserting the tabs 26 through the openings 28 and then bending them inwardly, as indicated best in Fig. 2.

The lower portion of the retainer ring 24 is adapted to lie within the complementary portion of the opening 20 in the lower section; and, in order to separably fix the two sections 12 and 14 together, a tongue 36 is formed on the retainer ring 24 adjacent the lower end thereof which is adapted to be received through a complementary opening 38 formed in the flange 22 of the lower section 14. When the tongue 26 is received within this opening 38, as best shown in Figs. 1 and 2, the forward end of the upper section 12 is pivotally mounted relative to the lower section 14, and the upper section 12 may be lowered so that the flange 18 overlaps the flange 16 to form the unitary casing 10.

The sections 12 and 14 are releasably secured together adjacent the rear of the casing 10 by means of a thumb screw 40 which is received through complementary openings in the flanges 16 and 18. A curved metal member 42 of suitable thickness is positioned within the rear corner of the flange 16 and is welded thereto. The member 42 is provided with a tapped opening 44 therethrough in alignment with the openings in the complementary openings in the flanges 16 and 18, which threadably receives the thumb screw 40. The thumb screw 40 may thus be threaded into or withdrawn from the opening 44 so that the forward end of the screw projects within the casing thereby forming part of the switch structure, according to the present invention, which will be described in greater detail hereinafter. When the thumb screw 40 is withdrawn from the tapped opening 44, the upper and lower sections may be separated from each other.

A mounting bracket 48 in the form of an elongated sheet metal member, having a downwardly offset portion 50 intermediate the ends thereof, is disposed within the casing and is fixed to the lower section 14 by means of rivets 52 or the like. Longitudinally extending ribs 54 may be formed in the bracket member 48, and preferably are so formed adjacent the corner portions thereof, for the purpose of stiffening and strengthening the bracket member.

The bracket 48 is shaped to provide upstanding end portions 56 and 58 at the front and rear, respectively, thereof. A light reflector 60 is fixedly secured to the upstanding portion 56 by means of a metal bulb socket 62. The bulb socket 62 has an outwardly disposed annular flange 64 thereon which engages the inner edge 66 of the central opening through the reflector 60 so that the reflector 60 is fixed to the upstanding portion 56 by bending the flange 64 outwardly. A flange 68 formed on bulb socket 62 engages the rear surface of the upstanding portion 56, so that the flanges 64 and 68 cooperate to fix the reflector 60 and socket 62 in position.

A light bulb 70 having a base 72 is adapted to be threadably received within the socket 62 with a portion of the base 72 projecting through the socket 62 in the usual way.

A battery mounting member in the form of a resilient sheet metal member 80 is fixed to the mounting bracket 48 by spot welding, or the like, intermediate the upstanding ends thereof. The member 80 is substantially semi-circular in cross-section with the upper edges 82 thereof bent slightly outwardly, so that dry cells 84 may be received therein in series and are resiliently held in place. The member 80 is free to expand so that as the dry cells become exhausted and expand they will not be frozen within the mounting means. Another resilient spring member 86 having downwardly directed resilient leg portions 88 is fixedly secured to the upper section 12 by means of a rivet 89 or the like; and when the upper section 12 is positioned over the lower section 14, the resilient legs 88 resiliently engage the tops of the dry cells 84 so that these dry cells are resiliently held in position.

In order to complete the circuit through the dry cells 84 and to urge the dry cells forwardly so that the base of the lamp bulb 72 is contacted by the terminals of the forward battery 84, a generally U-shaped flat spring 90 has one end 92 fixed securely to the upstanding portion 58 with its other end 91 resiliently bearing against and in contact with the base of the rearmost battery, so that the dry cells 84 are in contact with each other with the forwardmost dry cell in contact with the base 72.

The spring 90 forms one of the switch elements, and another of the switch elements 94 is attached to the end portion 92 in electrical contact therewith. The member 94 is in the form of an elongated stud and extends through a suitable opening in the upstanding portion 58, but is insulated therefrom by means of a fibrous grommet 96 and a fiber washer 98 which is disposed between the rear face of the spring portion 92 and the front face of the upstanding portion 58.

The contact element 94 extends rearward within the casing to a position within the rear corner thereof but spaced inwardly slightly from the innermost point of the rear corner. A flat metal spring member 101 has one end thereof fixed to and in contact with the casing by means of the rear rivet 52, which also rivets the rear end of the mounting bracket 48 to the casing. The rear end 102 of the flat spring 101 extends toward the rear of the casing and upwardly to a position immediately behind the rear end of the contact element 94. The contact element 94 is also substantially aligned with the thumb screw 40 so that the rear end 102 of the spring switch element 101 resiliently bears against the innermost end of the thumb screw 40 when the thumb screw is inserted within the casing. This structure provides a simplified switch mechanism in which the number of parts for lamp structure are reduced in that the thumb screw 40 serves to hold the casing sections in position and also acts as a movable switch element.

The bulb 70 is grounded to the casing in the usual way; and, to complete the electric circuit through the batteries and lamp bulbs, it is merely necessary to turn the thumb screw 40 in a clockwise direction, in which event the spring end 102 is resiliently urged against the rear end of the switch element 94 to ground the switch element 94 to the casing. The electric circuit is thus complete, and in order to break the circuit, it is merely necessary to turn the thumb screw 40 in a counter-clockwise direction, in which event the spring end 102 moves out of contact with the switch element 94. The spring 102 also has an additional function in that by resiliently bearing against the inner end of the thumb screw 40 it keeps a constant tension on the screw and prevents its backing out when subjected to vibration.

Also, according to the present invention, a novel and simplified means is provided for mounting the casing to the handle bars or frame member of a bicycle. Such mounting means includes a one-piece U-shaped mounting bracket 110 which is flanged outwardly at its ends as indicated at 112. A rubber pad 114 is disposed between the bracket and the lower section 14. A pair of screws 116 are adapted to be received through suitable openings in the flanges 112 and are also adapted to extend through suitable openings in the pad 114 and the lower casing section 14. Tapped openings 118 may be provided in the offset portion 50 of the bracket 48 for threadably receiving the screws 116 therein. The lamp may thus be conveniently applied to a conventional handle bar 119 by enveloping the handle bar with the bracket 110 so that the handle bar is drawn against the lower face of the pad 114. Transversely extending ribs 120 are preferably provided in the bracket 110 adjacent the base thereof which serve to grip the handle bars when the bracket is in position.

In connection with this mounting, it is pointed out that the bracket may be removed and the lamp may be mounted on the fender with the two mounting screws in that the rubber pad conforms to the shape of the fender.

In Fig. 6, a modified form of the invention is illustrated in which a touch switch is provided so that a horn, rather than a lamp, may be mounted within the casing. In this event, a horn similar to that described and claimed in the copending application of Lee M. Wiley, Serial No. 137,221, filed April 16, 1937, may be mounted on the upstanding portion 58 in a manner similar to that in which the reflector and bulb socket are mounted in the embodiment described above. A touch switch is, of course, necessary in such constructions, and in the embodiment illustrated in Fig. 6 an upstanding element 120 is mounted to the upstanding portion 58 in substantially the same way as the switch element 94 in the embodiment described above. The switch element 120 and the switch element 90 are in electrical contact with each other but are insulated from the upstanding member 58. A metal spring strip 122 is fixed by means of a rivet 124 to the upper casing section 12 and is thus grounded to the casing. The strip 122 extends above the contact element 120; and a horn button 126, formed of an insulating material, is slidably disposed through an opening in the upper section 12 and rests upon the spring strip 122. By depressing the button 126, the spring strip 122 is adapted to engage and contact the switch element and complete the electric circuit through the horn (not shown) by grounding the switch element 120 to the casing.

In this embodiment of the invention, the upper and lower sections 12 and 14 are releasably secured together adjacent the rear end of the casing 10 by means of a flat spring 130 which is riveted at one end by rivets 132 to the lower section 14. The spring 130 follows generally the contour of the lower section 14 and extends across the transverse center thereof. An outwardly projecting finger 134 is fixed to the free end of the spring 130 and extends through the complementary and overlying openings in the sections 12 and 14 when the sections are assembled. It is evident that to release the two sections from each other it is merely necessary to depress the finger 134 so that the upper section 12 may be released from and slid over the end of the finger 134. The spring 130 normally urges the finger 134 outwardly through the complementary openings so that the upper and lower sections are fixed relative to each other in assembled position.

Formal changes may be made in the specific embodiments of the invention described without departing from the spirit and substance of the invention, the scope of which is commensurate with the appended claims.

What is claimed is:

1. A bicycle attachment comprising an elongated casing split longitudinally thereof into upper and lower complementary sections, said sections being separable from each other and being shaped to provide an open end and a closed end, a longitudinally extending mounting bracket disposed within said casing and fixed to the lower section, said bracket having upstanding end portions adjacent said open and closed ends respectively, a battery mounting means fixed to said bracket intermediate said end portions, switch elements mounted on the one of said portions adjacent said closed end, a lamp reflector fixed to the other of said end portions adjacent said open end, a resilient switch element fixed to the lower casing and extending rearwardly and upwardly to a position behind and adjacent said first-named switch element, and movable means extending through said casing engaging said resilient switch element so constructed and arranged as to urge said resilient switch element against said other switch element to complete an electric circuit.

2. A bicycle lamp comprising an elongated casing split longitudinally thereof into upper and lower complementary sections, said sections being separable from each other, a longitudinally extending mounting bracket disposed within said casing and fixed to said lower section, said bracket having upstanding end portions, a battery mounting means fixed to said bracket intermediate said end portions, a lamp reflector fixed to one of said end portions, switch elements mounted on the other of said end portions, said switch elements including a rearwardly disposed contact element, said last-named switch element being insulated from said casing, a resilient switch element fixed to said casing in contact therewith extending to a position adjacent said last-named switch element, and movable means extending through both of said casing sections to hold said sections together and engaging said resilient switch element, said last-named means being movable so as to urge said resilient switch element against said last-named switch element to complete the electric circuit.

3. A bicycle lamp comprising an elongated casing split longitudinally thereof into upper and lower complementary sections, said sections being separable from each other with the adjacent edges lying in overlapping relationship, a longitudinally extending mounting bracket disposed within said casing and fixed to said lower section, said bracket having upstanding end portions, a resilient battery mounting means fixed to said bracket intermediate said end portions, a light reflector fixed to one of said end portions, switch elements fixed to the other of said end portions and insulated therefrom, said switch element including a rearwardly disposed contact element, an elongated resilient element having one end fixed to said casing in contact therewith with the other end thereof extending to a position behind said rearwardly disposed contact element, and a screw threadably received through the overlapping portions of said sections, said screw being so constructed and arranged as to engage and urge said resilient element against said rearwardly disposed switch element, to thereby complete the electric circuit.

WILLIAM C. CRIMMINS.